United States Patent
Cerny et al.

(10) Patent No.: US 6,887,066 B2
(45) Date of Patent: May 3, 2005

(54) APPARATUS FOR MOLDING A PLASTIC CLOSURE WITH AIR-ASSISTED EJECTION

(75) Inventors: David Cerny, Crawfordsville, IN (US); Ramesh Kamath, Crawfordsville, IN (US); Mark Powell, Crawfordsville, IN (US); Greg Mishler, Crawfordsville, IN (US); Sohail Sadiq, Crawfordsville, IN (US); David Oles, Crawfordsville, IN (US); Lindsey Abney, Crawfordsville, IN (US)

(73) Assignee: Alcoa Closure Systems International, Crawfordsville, IN (US)

( * ) Notice: Subject to any disclaimer, the term of this patent is extended or adjusted under 35 U.S.C. 154(b) by 71 days.

(21) Appl. No.: 10/350,857

(22) Filed: Jan. 24, 2003

(65) Prior Publication Data

US 2004/0145087 A1 Jul. 29, 2004

(51) Int. Cl.[7] .............................................. B29C 49/70
(52) U.S. Cl. ...................................... 425/556; 264/335
(58) Field of Search ........................... 425/556; 264/335

(56) References Cited

U.S. PATENT DOCUMENTS

| | | | |
|---|---|---|---|
| 4,343,754 A | 8/1982 | Wilde et al. | |
| 4,497,765 A | 2/1985 | Wilde et al. | |
| 4,660,801 A | * 4/1987 | Schad | 249/66.1 |
| 5,554,327 A | 9/1996 | Ingram et al. | |
| 5,670,100 A | 9/1997 | Ingram | |
| 5,786,079 A | 7/1998 | Alieri | |
| 5,866,177 A | 2/1999 | Ingram | |
| 6,177,041 B1 | * 1/2001 | Bietzer | 264/318 |

FOREIGN PATENT DOCUMENTS

WO    WO01/32390    5/2001

* cited by examiner

Primary Examiner—Suzanne E. McDowell
(74) Attorney, Agent, or Firm—H. Eric Fischer; Eckert Seamans Cherin & Mellott, LLC

(57) ABSTRACT

An apparatus for molding a plastic closure includes a male mold assembly including a forming pin and an outer pin sleeve which cooperate with a female mold for defining a mold cavity. To facilitate mechanical stripping of a molded closure from the forming pin, pressurized air is introduced into the molded closure through at least one air passageway which extends axially between the forming pin and pin sleeve. By outwardly expanding and forming the plastic closure during ejection from the forming pin, forces to which the closure is subjected during ejection are significantly reduced, thereby desirably reducing the amount of cooling of the closure that is required during the molding cycle prior to ejection. Significantly increased operating speeds for the compression molding apparatus can thus be achieved.

12 Claims, 8 Drawing Sheets

APPARATUS FOR MOLDING A PLASTIC CLOSURE WITH AIR-ASSISTED EJECTION

TECHNICAL FIELD

The present invention relates generally to an apparatus and method for compression molding a plastic closure, and more particularly to an apparatus and method for effecting air-assisted ejection of a molded closure from associated mold tooling, thereby facilitating high-speed closure manufacture while avoiding unacceptable closure deformation.

BACKGROUND OF THE INVENTION

Compression molded plastic closures have found very widespread acceptance in the marketplace, with such closures being particularly suited for use on carbonated beverages, as well as other applications requiring the desirable strength and sealing characteristics which such closures can provide. Additionally, these types of closures can be readily configured to provide tamper-indication, thus assuring consumers of the desired product quality.

U.S. Pat. No. 4,378,893, No. 4,407,422, No. 4,418,828, and No. 4,978,017, all hereby incorporated by reference, illustrate plastic closure constructions, including closures which can be configured for tamper-indication, which can be efficiently and economically formed by compression molding. U.S. Pat. No. 4,343,754, No. 4,497,765, No. 5,554,327, No. 5,670,100, and No. 5,866,177, all hereby incorporated by reference, disclose methods and apparatus by which plastic closures can be formed by compression molding.

For typical applications, a compression molded closure includes a retention element, typically in the form of a helical thread formation, on an inside surface of a skirt portion of the closure. A male mold of the compression molding tooling, sometimes referred to as a forming pin, includes an outer mold surface which is suitably configured for formation of the closure thread formation. In order to facilitate high-speed manufacture of such closures, it has typically been the practice to mechanically "strip" the molded plastic closure from the forming pin, without any relative rotation for "unthreading" the closure from the forming pin. Mechanical stripping of the interference fit between the molded closure and the forming pin requires that the skirt portion of the closure be outwardly deformed as the closure threads are urged out of the grooves or other features of the forming pin within which they are molded.

Experience has shown that deformation of the thread formation which can occur attendant to this stripping action generally acts to limit the speeds with which plastic closures can be formed. While typical rotary compression molding machines include water cooling passages within the mold tooling components, operational speeds are typically limited by the time required for the molded thread formation to become sufficiently solid as to permit the mechanical stripping of each closure from its respective forming pin, without unacceptable deformation of the thread formation or other portions of the closure.

Heretofore, efforts have been made to facilitate this mechanical stripping of a threaded plastic closure from an associated male mold tooling. Use of compressed gas, directed into a molded plastic closure during removal from associated tooling, has been practiced in connection with injection molding of closures. Efforts have also been made to incorporate such air-ejection arrangements in compression molding equipment, such as exemplified by U.S. Pat. No. 5,786,079, hereby incorporated by reference, and published PCT patent application No. WO 01/32390, hereby incorporated by reference. However, these previously known arrangements have undesirably increased the complexity of tooling, and in one construction, required the provision of an air passage which generally tends to reduce the sizes of coolant passages within the tooling. Such arrangements have also been generally limited in the size of passageways provided for direction of air into a molded closure, and have been configured in a way which can undesirably result in thin metal portions of tooling, detracting from durability.

The present invention is directed to an improved apparatus for compression molding of plastic closures, and method of operation, which facilitates high-speed closure manufacture by introduction of compressed gas, air, typically into a molded closure during its removal from an associated male mold forming pin, with the system desirably configured to maintain the integrity of the associated tooling, and permitting cost-effective use in compression molding equipment.

SUMMARY OF THE INVENTION

The present invention is directed to an apparatus for molding a plastic closure, and method of operation, which facilitates high-speed closure manufacture by introduction of compressed gas (air) into a molded plastic closure during that portion of the molding cycle in which the plastic closure is mechanically "stripped" from an associated male mold forming pin. In the illustrated embodiment, wherein the apparatus is configured for molding a plastic closure including a retention element, typically in the form of a helical thread formation for securing the closure on an associated container, the apparatus is configured in a manner which directs pressurized air into the closure in a region between the retention element and a free edge of the closure. This has been found to desirably create forces on the interior of the closure, particularly in the region of the retention element (thread formation) which greatly facilitate high-speed removal of the closure from the associated male forming pin.

Notably, incorporation of the air-ejection system into compression molding tooling is facilitated by directing the air into the molded closure in one or more passageways formed between the male forming pin and an associated outer pin sleeve. Passages having the desired flow area can be readily formed, while maintaining the integrity of the mold tooling, and without requiring any significant reduction in the size and/or number of coolant passages which typically are provided in the compression molding tooling to facilitate solidification of molten plastic after it is compression molded.

In accordance with the illustrated embodiment, an apparatus for molding a plastic closure comprises a male mold assembly including a central forming pin, and an outer pin sleeve within which the forming pin is positioned. The apparatus further includes a female mold which cooperates with the male mold to define a generally cup-shaped mold cavity to form the plastic closure with a top wall portion, and an annular skirt portion. The male mold assembly and female mold are relatively movable to open the mold cavity for removal of the molded plastic closure from a free end of the central forming pin.

In the illustrated embodiment, the male mold assembly includes an ejection sleeve positioned about the outer pin sleeve, with the forming pin and ejection sleeve being relatively movable so that engagement of the ejection sleeve with the skirt portion of the molded plastic closure moves the plastic closure off of the forming pin. When the plastic closure is formed with a retention element, such as in the form of a helical thread formation, on the inside surface of the skirt portion, the action of the ejection sleeve acts to "strip" the molded plastic closure from the central forming pin by dislodging the closure thread formation from the forming pin.

The male mold assembly defines at least one air passageway which extends axially between the central forming pin and the outer pin sleeve. The air passageway can be placed in fluid communication with the mold cavity to permit pressurized air to be directed into the molded plastic closure after removal from the female mold, to thereby facilitate removal of the closure from the central forming pin. Notably, the apparatus is configured such that the air passageway communicates with the mold cavity at a region between the retention element of the molded closure, and a surface of the closure, typically a free edge of the skirt portion, which sealingly engages the ejection sleeve. By this arrangement, the molded closure is sealed against the ejection sleeve as pressurized air is directed into the closure. The closure expands outwardly in a balloon-like fashion, thereby facilitating mechanical stripping of the closure from the central forming pin, including removal of the closure thread formation from the exterior surface of the forming pin within which the thread formation is molded.

In accordance with the preferred embodiment, the central forming pin and outer pin sleeve are relatively movable, and define an annular forming surface therebetween adjacent a free edge of the skirt portion of the plastic closure. In a typical configuration, the skirt portion of the plastic closure includes at least one tamper-indicating element, which element is formed against the annular forming surface of the central forming pin. Notably, this same interface between the outer pin sleeve and the central forming pin acts to provide a valve-like mechanism which controls and throttles the pressurized air being directed into the molded plastic closure, with pressurized air thus being directed into the plastic closure during the ejection portion of the molding cycle.

Preferred features of the present apparatus facilitate efficient, high-speed operation while avoiding undesirable deterioration of the mold tooling. In the preferred form, a plurality of air passageways extend axially between the central forming pin and outer pin sleeve of the male mold assembly, with one or more circumferential channels provided extending between the forming pin and pin sleeve, joining the plurality of air passageways in fluid communication. In the illustrated embodiment, a pair of circumferential channels are provided joining the plurality of axial air passageways, with an upper one of the channels acting to distribute air among the air passageways, and with a lower one of the circumferential channels desirably acting as an accumulator for the compressed air. In the preferred form, the plurality of axial air passageways are arranged so as to balance reactive forces created by air pressure between the central forming pin and outer pin sleeve, thus avoiding undesirable binding or wear of the mold tooling, which can otherwise result from an imbalance created within the tooling by delivery of compressed air between the forming pin and pin sleeve.

By the outward deformation or bulging of the skirt portion of the molded plastic closure, the force required for mechanically stripping the plastic closure from the forming pin is desirably reduced. This results in less closure deformation, which can otherwise be exhibited by bulged portions of the closure, particularly in the region of the tamper-indicating feature, as well as in the form of deformed threads.

Other features and advantages of the present invention will become readily apparent from the following detailed description, the accompanying drawings, and the appended claims.

DETAILED DESCRIPTION

Figure 1:
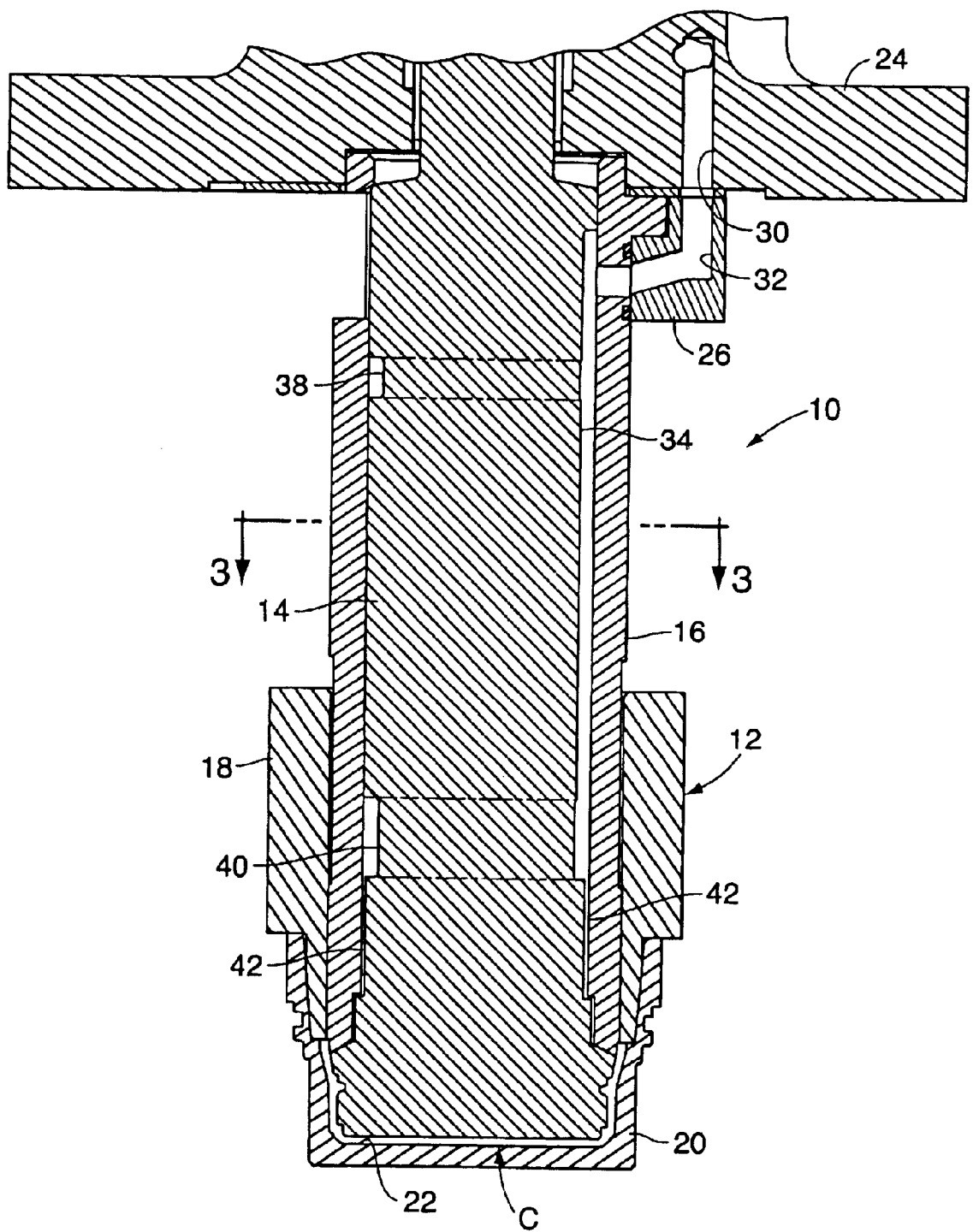
FIG. 1 is a diagrammatic view of an apparatus for molding a plastic closure embodying the principles of the present invention.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

The present invention is directed to a compression molding apparatus, and method of operation, which facilitates high-speed manufacture of molded plastic closures or like articles by the introduction of pressurized air into the molded closure during ejection of the closure from the associated tooling. In a typical compression molding apparatus, a rotary or turret compression molding machine includes a plurality of mold tooling assemblies which are configured for operation attendant to rotary movement of the compression molder. Each tooling assembly is moved relative to a suitable extruder or like device, and associated metering mechanism, which deposits a predetermined quantity of molten plastic material into each of the mold assemblies when the assembly is in an opened condition. Continued rotary motion of the apparatus effects closing of each mold assembly, typically by cam-actuation, whereby the quantity of molten material is compressed between a male forming pin and a female mold cavity, to thus form a molded plastic closure. The mold tooling is typically provided with internal coolant passages through which coolant is circulated as the compression molder rotates in order to quickly solidify the molten plastic into the desired cup-like molded plastic closure.

After the plastic closure is molded, and solidified sufficiently as to permit its removal from the mold tooling, the mold tooling is opened to permit closure removal. Typically, a male mold assembly and associated female mold are relatively moved, thereby exposing the molded closure, as it remains in position on the male mold assembly. Because the plastic closure is typically formed with a top wall portion, a depending annular skirt portion, and at least one retention element, typically a helical thread formation on the inside surface of the closure skirt, the closure is retained on the male mold tooling by what is, in essence, an interference fit, as the thread formation is retained within that portion of the male mold tooling in which it is formed.

While it is known to effect closure removal by "unthreading" the molded closure from the male tooling, high speed manufacture is facilitated by mechanically stripping the closure from the tooling. This is ordinarily effected by relatively moving that portion of the male mold, which retains the closure, relative to an associated ejection or stripper sleeve which engages the free edge of the closure skirt. Axial forces thus created on the skirt portion result in the outward deformation of the skirt portion as the closure thread formation moves out of the region of the male tool in which it is formed. Because the thread formation, by virtue of its cross-sectional area, is typically one of the last portions of the closure to fully solidify, operating speed of the molding apparatus is typically limited by the time required to solidify the thread formation sufficiently as to avoid its unacceptable deformation as the closure is mechanically stripped from the male tooling.

The present invention is directed to a compression molding apparatus, including a male mold assembly, which is specifically configured to facilitate high-speed manufacture by the direction of pressurized air into the molded plastic closure during the ejection portion of the molding cycle. Significantly, because the present invention desirably acts to reduce the forces to which the closure thread formation is subjected during ejection, operating speeds for the molding apparatus can be very dramatically increased, thus greatly facilitating manufacturing efficiency. As will be appreciated, such increased forming speeds are a direct result of the reduced stresses to which the closure thread formation is subjected, thus permitting higher operating speeds without unacceptable closure deformation.

With reference now to the drawings, therein is illustrated a plastic closure mold tooling assembly 10 embodying the principles of the present invention. As will be recognized by those familiar with the art, mold tooling assembly 10 is configured for effecting compression molding of plastic material within a mold cavity defined thereby, as will be further described. The mold tooling assembly is typically one of numerous tools mounted on a rotary or turret compression molding apparatus, with driven rotation of the apparatus cycling each tooling assembly through the necessary stages for plastic closure manufacture. As is known in the art, mold tooling assembly 10 typically includes internal coolant passages (not shown) to facilitate solidification of a molded plastic closure, so as to create sufficient column strength in the closure sidewall or skirt portion to permit stripping of the closure from the mold tooling, thus promoting high-speed production.

As illustrated, the mold tooling assembly 10 includes a male mold assembly 12 including a central forming pin 14, and an outer pin sleeve 16 within which the forming pin is positioned. The male mold assembly further includes an ejection sleeve 18 positioned about the outer pin sleeve 16, with the forming pin 14 and ejection sleeve 18 being relatively movable so that engagement of the ejection sleeve with the skirt portion of a molded plastic closure moves the plastic closure off of the forming pin. Ejection in this manner will be further described hereinafter.

The mold tooling assembly 10 further includes a female mold which cooperates with the male mold assembly 12 to define a mold cavity 22 to form a plastic closure. A plastic closure, designated C, is diagrammatically illustrated in the drawings, and includes a top wall portion W, and an annular skirt portion or side wall S. The annular skirt portion S includes at least one retention element on the inside surface thereof for securing the closure on an associated container. The retention element typically comprises a thread formation, designated T, but it will be understood that this specific configuration of the retention element may be varied while keeping with the principles disclosed herein.

The mold tooling assembly 10 is carried by the associated rotary compression molder by a clevis 24. A pin sleeve retainer 26 is positioned generally beneath the clevis 24 adjacent to the outer pin sleeve 16 of the tooling assembly. Operation of the tooling assembly is typically effected by suitable cams which act to relatively move the various components of the tooling for closing the mold cavity after a predetermined quantity of molten plastic material is received therein. Actuation of the tooling effects compression molding of the plastic to form the plastic closure in the mold cavity, with the tooling thereafter opened to facilitate removal of the molded closure, in particular, removal of the molded closure from the plunger-like end of the central forming pin 14. Forces for compression molding of the plastic are typically directed through the clevis 24, the pin sleeve 16, the forming pin 14, and the female mold 20.

In accordance with the present invention, the present molding apparatus is configured to direct pressurized gas, air, typically into the molded plastic closure to facilitate its removal from the central forming pin 14. To this end, an air delivery arrangement is provided for directing pressurized air into a plastic closure formed within the mold cavity 22. While use of air as the pressurized gas for the practice of this invention is presently preferred, it will be understood that a suitable gas other than air can be employed for practice of the present invention. Thus, it is to be understood that use of the term "air" herein with reference to the gas which is pressurized to facilitate closure ejection is intended to encompass other suitable gasses.

Figure 2:
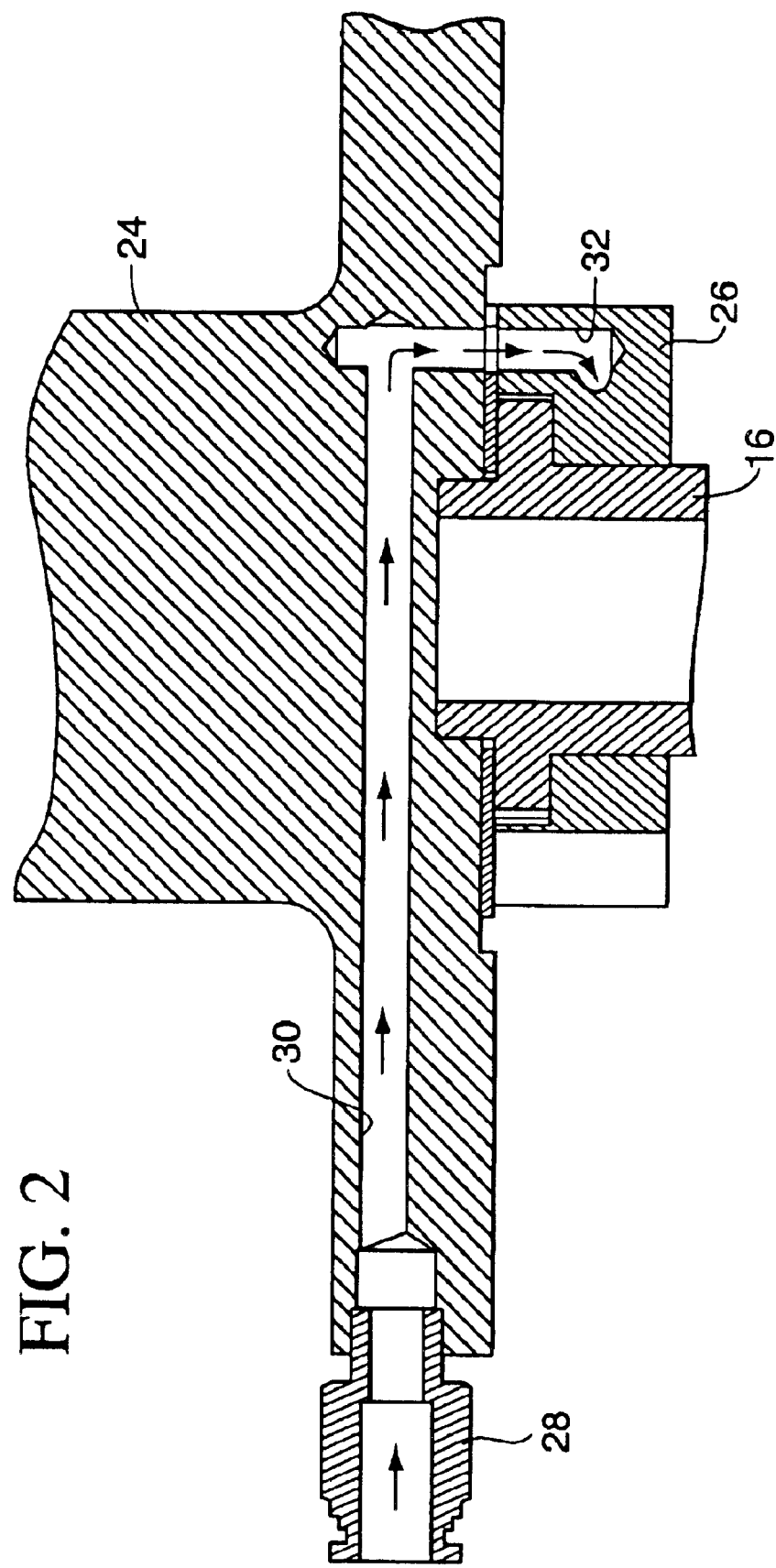
FIG. 2 is a relatively enlarged, fragmentary view of the apparatus illustrated in FIG. 1, with a forming pin of the apparatus not shown.

As illustrated in FIGS. 1 and 2, the air delivery arrangement includes a coupling 28 mounted in clevis 24, with the coupling communicating with an internal passage 30 defined by the clevis. Pressurized air directed through the coupling 28 into the passage 30 is delivered to the mold tooling assembly from an associated rotary union, which provides a valve-like action to direct pressurized air into the tooling assembly during that portion of the molding cycle in which ejection of the molded closure is effected. While use of a rotary union (not shown) is presently preferred, it will be recognized by those skilled in the art that other valving arrangements, such as suitable electromechanical valves or the like, may alternatively be employed for porting pressurized air to the tooling during the appropriate portion of the molding cycle.

Figure 3:
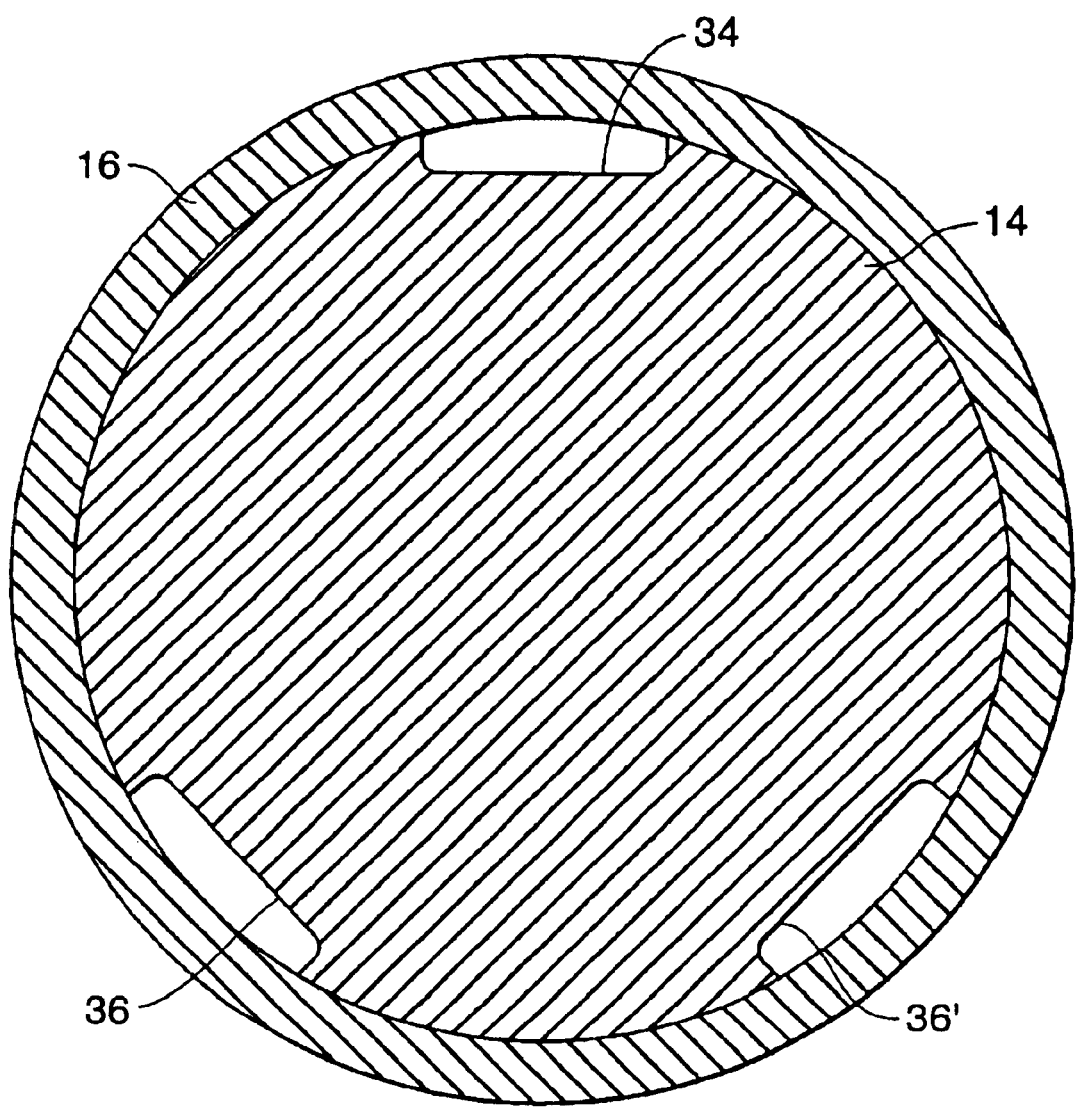
FIG. 3 is a diagrammatic, cross-sectional view of the apparatus shown in FIG. 1, taken generally along lines 3—3 of FIG. 1.
Figure 4:
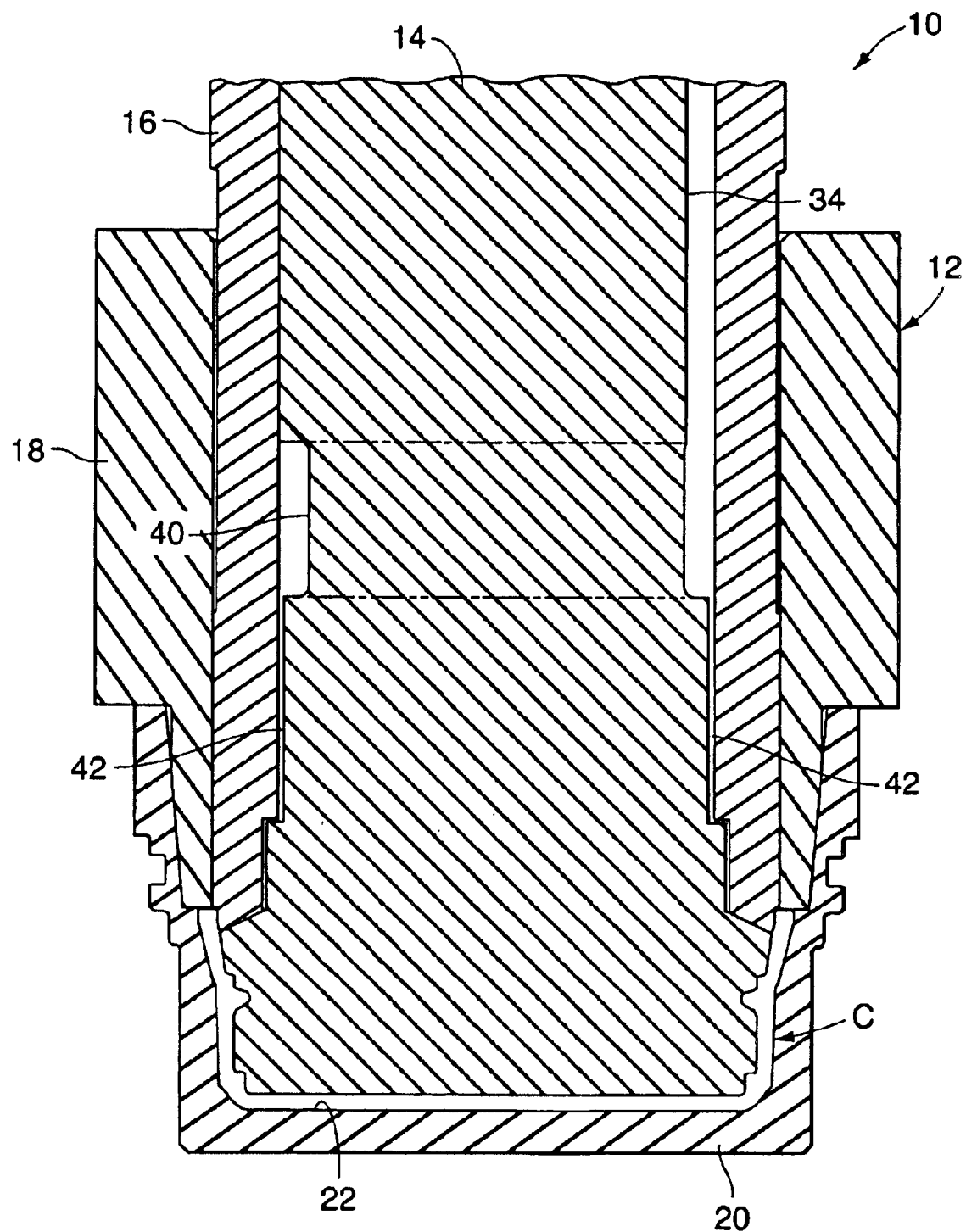
FIG. 4 is a relatively enlarged, diagrammatic view of the apparatus illustrated in FIG. 1, illustrating the apparatus in a closed configuration for molding a plastic closure therein.

The passage 30 of the clevis 24 is in fluid communication with a passage 32 defined by pin sleeve retainer 26, with the passage 32 in turn communicating with a port defined by pin sleeve 16, and an axial air passageway 34 defined between forming pin 14 and outer pin sleeve 16. While the present invention contemplates that at least one air passageway 34 be provided between the forming pin 14 and pin sleeve 16, it is presently preferred that a plurality of air passages be provided extending axially between the forming pin and outer pin sleeve. The presently preferred arrangement of such air passages is illustrated in FIG. 3, which illustrates, in cross-section, the forming pin 14 and the outer sleeve 16. The preferred provision of a plurality of air passageways arranged to balance forces exerted on the forming pin avoids undesirable binding and wear of the tooling components. In the illustrated arrangement, the tooling is provided with the aforesaid air passageway 34, as well as a pair of air passageways 36, 36', which are configured to balance forces exerted between the forming pin 14 and the pin sleeve 16. While it is within the purview of the present invention that a pair of diametrically opposed air passageways can be employed, experience has shown that the use of three air passageways 34, 36, 36', desirably acts to provide stable balancing forces between the forming pin and pin sleeve. By this arrangement, undesirable binding between the tooling components is desirably avoided. As will be recognized, more than three air passageways can be provided between the forming pin and pin sleeve, with the desired effect being balancing of forces created by air pressure within the tooling assembly, thereby avoiding binding and undesirable wear.

As will be appreciated, the provision of air passageways 34, 36, 36', defined between the forming pin and the pin sleeve, desirably avoids the requirement for additional internal components within the tooling assembly. Rather, the passageways can be provided by forming channel-like regions at the interface of the forming pin and pin sleeve. The air passageways can be desirably formed without any significant reduction in the structural integrity of the tooling, and without resort to any reduction in the size of the coolant passages (not shown) within the tooling assembly.

In order to provide the desired distribution of pressurized air between the plural air passageways, the tooling assembly includes at least one circumferential channel 38, extending between the forming pin 14 and the pin sleeve 16, for joining the plurality of air passageways in fluid communication with each other. Circumferential channel 38 acts to distribute pressurized air introduced into the tooling assembly to the plural air passageways provided between the pin sleeve and forming pin, thus achieving the desired balancing of forces exerted between the forming pin and pin sleeve.

In accordance with the illustrated embodiment, it is presently preferred that another circumferential channel 40 be provided in generally axially spaced relationship to channel 38. Channel 40 is also in fluid communication with a plurality of air passageways 34, 36, 36', and desirably functions as an accumulator to accumulate pressurized air prior to introduction of the air into a plastic closure being formed.

Pressurized air from channel 40 is directed into the mold cavity 22 by a plurality of smaller air passageways 42 which are spaced circumferentially about the forming pin 14 generally between the forming pin and the distal end of the outer pin sleeve 16. Passageways 42 can be formed by flats defined by the forming pin 14, with a current embodiment including eight such passageways.

The specific configuration of the mold tooling assembly 10 of the present apparatus will, of course, be dependent upon the specific structural features of the plastic closure C being molded. For many applications, it is desirable to provide the closure C with tamper-indicating capabilities, and to this end, the plastic closure is typically provided with at least one tamper-indicating element provided on the inside surface of the skirt portion of the closure. Such tamper-indicating elements are diagrammatically illustrated in phantom line at E in FIG. 8, with these types of tamper-indicating elements typically being provided in the form of one or more projections which are configured to operatively engage the associated container during closure removal. Typically, a frangible connection is provided between a lower portion of the closure skirt and the remainder of the skirt, whereby engagement of the one or more tamper-indicating elements with the associated container effects fracture of the skirt portion, and thus readily visibly discernable evidence that the closure has been partially or completely removed from the associated container.

Figure 5:
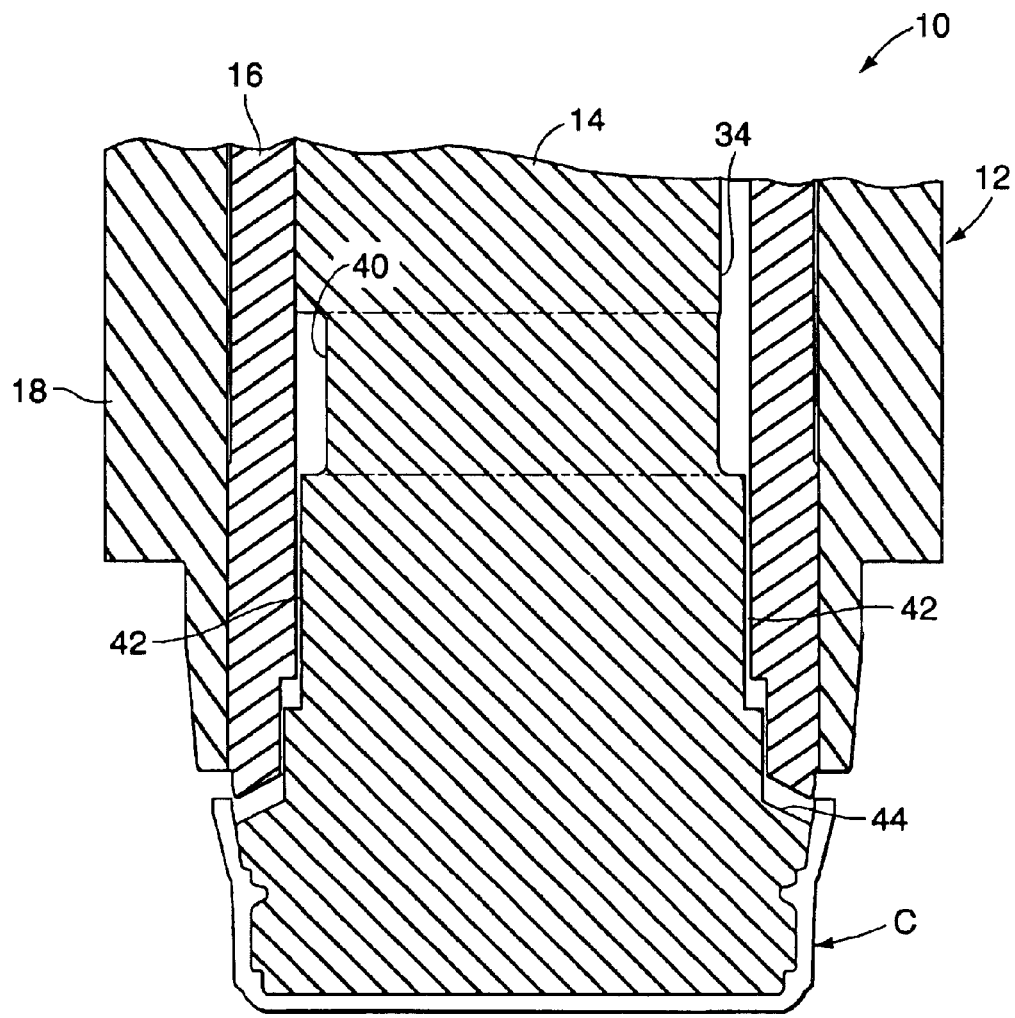
FIG. 5 is a view similar to FIG. 4 illustrating the present apparatus in an open condition, with removal of a molded plastic closure from an associated forming pin being initiated.

In order to form closure C with one or more such tamper-indicating elements E, the mold tooling assembly 10 is configured such that the central forming pin 14 and outer pin sleeve 16 are relatively movable, and define an annular forming surface 44 therebetween adjacent a free edge of the skirt portion S of the plastic closure C. FIG. 5 illustrates forming pin 14 and outer pin sleeve 16 after such relative movement therebetween, as would take place after removal of the molded closure C from within female mold 20.

Notably, forming surface 44 not only provides a surface against which the one or more tamper-indicating elements E are formed, but additionally cooperates with a mating annular surface at the distal end of the pin sleeve 16 such that the forming pin and pin sleeve act together to control flow of pressurized air into the molded closure as the air moves out of air passageways 42. A throttling-like effect is achieved, as pressurized air is directed between the forming pin and the pin sleeve. It is presently preferred that this valve-like region not be completely air tight, since this region desirably provides a vent path for air to leave the mold cavity 22 as the mold assembly is being closed, and plastic flows upwardly about the forming pin 14. Venting of air during this portion of the molding cycle is especially preferred to avoid the formation of air bubbles or other voids in the molded plastic article.

Relative axial movement of the forming pin 14 and pin sleeve 16 may be mechanically effected, such as by cam-actuation, but in a typical construction, the tooling is configured for relative movement which is induced attendant to opening of the mold assembly by separation of the female mold 20 from the male mold assembly 12.

After the relative movement of forming pin 14 and pin sleeve 16, illustrated in FIG. 5 for facilitating removal of the tamper-indicating elements of the plastic closure C, removal of the plastic closure from the forming pin is effected by "stripping" of the plastic closure from the forming pin, without relative rotation or "unthreading" of the thread formation or other retention element of the closure from the features of the forming pin in which the thread formation is formed. Closure ejection is effected by relative movement of the forming pin 14 and outer pin sleeve 16 relative to ejection sleeve 18. Again, such relative movement is typically effected by cam-actuation, such as by upward movement of the forming pin and pin sleeve relative to the vertically fixed ejection sleeve 18.

Heretofore, ejection of the plastic closure was effected by creation of sufficient force against the free edge of the skirt portion of the closure by ejection sleeve 18 so as to urge the thread formation of the closure out of and off of the forming pin 14. This, of course, requires the closure to be sufficiently solidified as to avoid excessive bulging or deformation of the skirt portion, particularly in the region of the tamper-indicating pilfer band. Additionally, the relatively large forces to which the just-formed closure threads were typically subjected acted to limit forming speeds, since the threads needed to be sufficiently solidified as to preclude unacceptable deformation as the closure was forcibly stripped from the forming pin.

In accordance with the present invention, the direction of pressurized air into the closure during the ejection phase of the molding cycle very significantly reduces the stresses to which the closure is subjected, thus reducing the level of solidification and strength that the closure must exhibit during the stripping process. This, in turn, directly results in significantly increased operational speeds for the compression molding apparatus.

Figure 6:
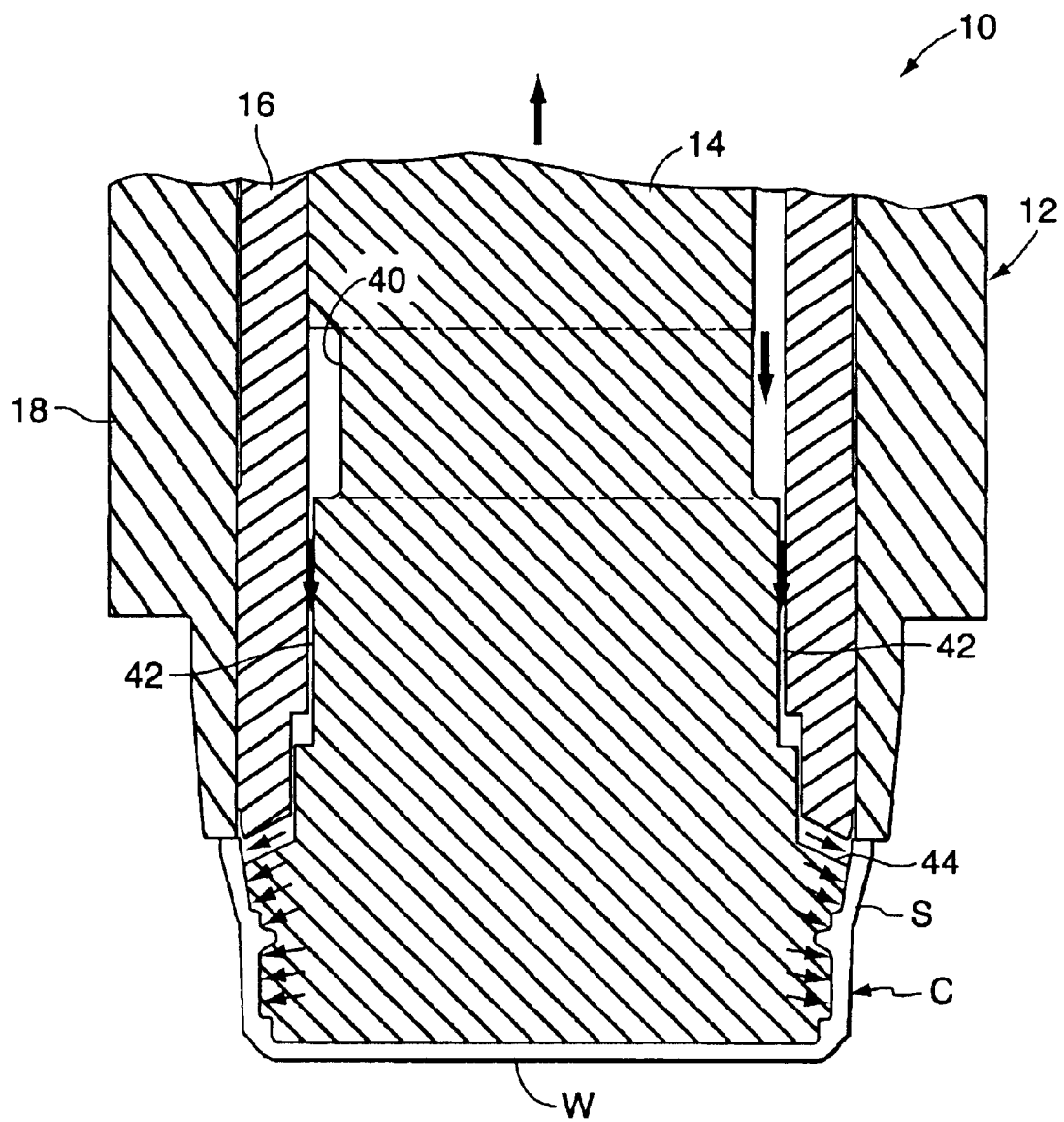
FIG. 6 is a view similar to FIG. 5 further illustrating removal of the molded plastic closure from the associated forming pin, with the closure having been sealed against an associated ejection sleeve, and pressurized air introduced therein.

In order to effectively pressurize the interior of the closure C, it is contemplated that the closure be sealed, to a sufficient degree, at the free edge of the closure skirt portion against the ejection sleeve 18. FIG. 6 illustrates the closure in this sealed disposition with respect to the ejection sleeve 18, with the annular forming surface 44 of the forming pin, and its cooperating mating surface at the free end of pin sleeve 16, having been opened to facilitate removal of the closure tamper-indicating elements.

Pressurized air is directed into the plastic closure from the accumulator circumferential channel 40, through the plural air passageways 42, and across annular forming surface 44. By this arrangement, pressurized air is directed into the plastic closure in the region between the thread formation T, or other retention element of the closure, and the surface of the closure which engages the ejection sleeve 18, typically the free edge of skirt portion S. The circumferential seal created between the free edge of the closure and the ejection sleeve 18 is effective to permit the pressurized air being directed into the closure to act against the inside surface of the closure skirt (as indicated by the arrows in FIG. 6) and thereby bulge or "balloon" the closure as the closure is urged off of the forming pin by relative movement of the forming pin and the ejection sleeve 18.

Introduction of pressurized air into this region of the molded closure is particularly preferred, since it acts at the portion of the closure between the thread formation and the free edge of the closure to outwardly bulge the portion of the closure positioned above (referring to the illustrated orientation) the thread formation. This is in significant distinction from previous air ejection arrangements, in which air is directed into a closure between the thread formation (or other retention element) and the closure top wall portion. In such previous arrangements, the thread formation can undesirably act as a seal against flow of pressurized air against the entire inside surface of the skirt portion, particularly that region adjacent the free edge of the skirt at which outward bulging is most desired for reducing the stresses created on the closure threads during stripping from the forming pin.

Pressurized air is directed through the male mold assembly from the associated rotary union during this portion of the molding cycle as the closure is sealed against the ejection sleeve 18, with sufficient dwell created in the operation of the mold tooling to permit sufficient pressurization of the closure. In a typical application, pressurized air is delivered through the air supply system at a pressure of about 50 psi.

Figure 7:
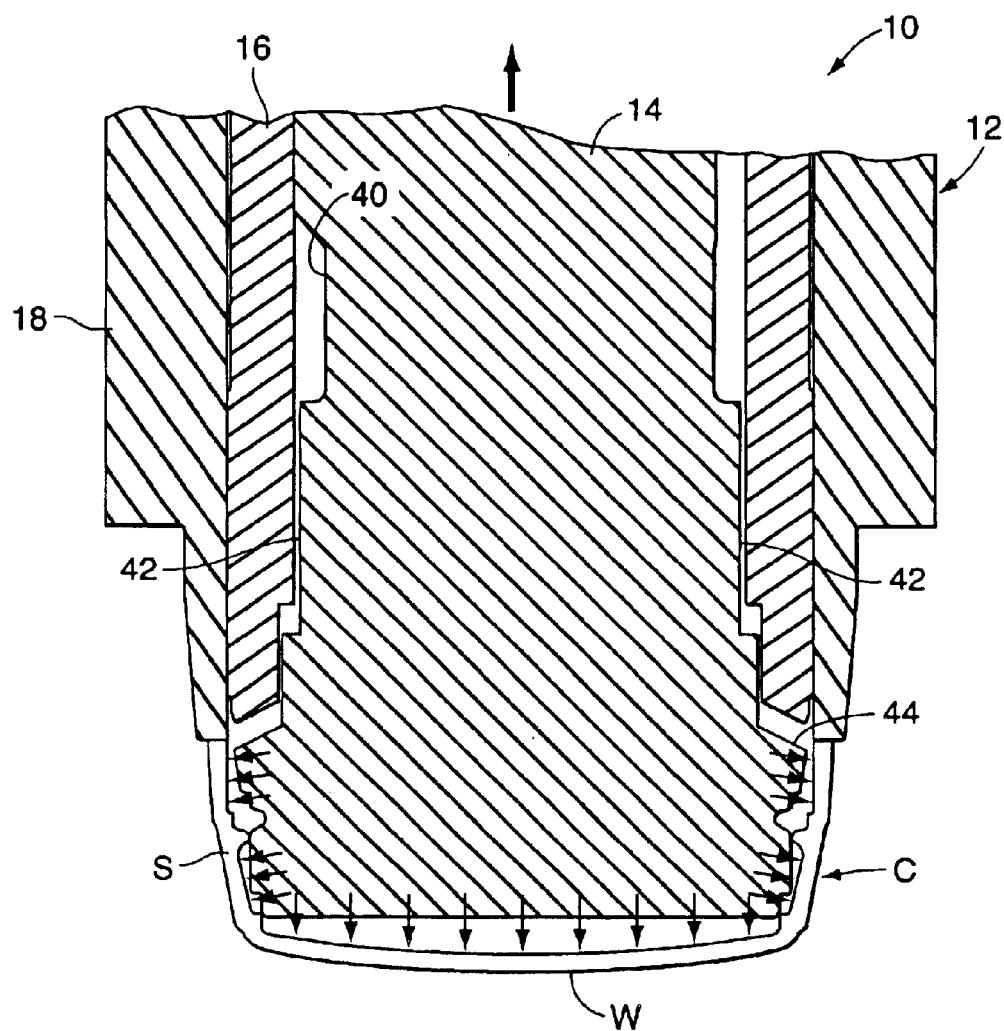
FIG. 7 is a view similar to FIG. 6 further illustrating removal of the molded plastic closure from the associated forming pin diagrammatically illustrating air pressure forces acting against the interior surfaces of the illustrated plastic closure for facilitating its removal from the associated forming pin.

FIG. 7 illustrates further internal pressurization of the closure C as the closure is stripped from the forming pin 14 by the ejection sleeve 18. As indicated by the arrows, air pressure within the closure acts against the inside surface of the skirt portion of the closure, as well as against the inside surface of the top wall W of the molded closure.

The inside surface of the top wall of the closure will be momentarily pressurized as the closure is removed from the forming pin 14 a sufficient amount as to permit the pressurized air being directed into the closure to move around the peripheral bottom edge of the forming pin 14. By breaking the natural vacuum which ordinarily is created between the inside surface of the closure and the bottom surface of the forming pin, closures having flatter, more planar top walls can be formed.

As air pressurization acts to outwardly bulge the skirt portion of the closure to facilitate disengagement of the thread formation T from the forming pin 14, the one or more tamper-indicating elements of the closure are urged outwardly off of the forming surface 44 of the forming pin 14. In effect, a "radial" ejection force is created. This desirably acts to reduce the stresses to which the tamper-indicating elements are subjected during closure ejection, thus desirably resulting in enhanced strength for such elements. Enhanced strength for such elements can facilitate their desired mechanical interaction with an associated container for tamper-indication.

Figure 8:
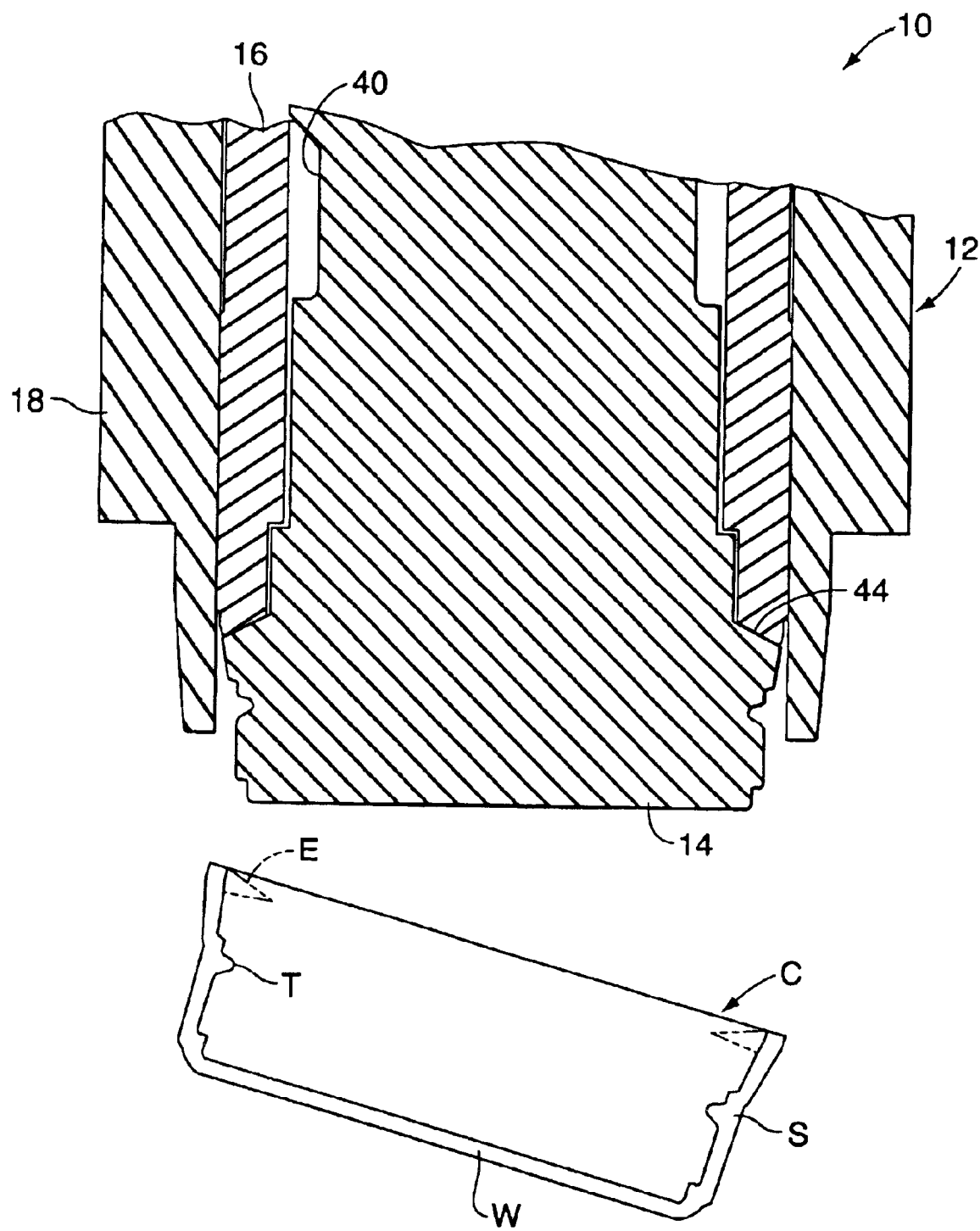
FIG. 8 diagrammatically illustrates the completion of removal of the molded plastic closure from the forming pin of the associated tooling.

FIG. 8 illustrates completion of the ejection cycle with removal of closure C from the forming pin 14. The relative movement between the forming pin 14 and the ejection sleeve 18 has been completed, and the forming surface 44 of the forming pin again moved into cooperating relationship with the mating annular surface at the distal end of outer pin sleeve 16. At this portion of the molding cycle, air pressure being directed into the mold assembly from the associated rotary union is discontinued, thus preparing the mold assembly for the next mold cycle.

Thus, the present invention greatly facilitates high-speed manufacture of molded plastic closures. Internal pressurization of the molded closure during ejection greatly reduces the stresses to which the closure is subjected as it is mechanically stripped from the associated forming in, thus permitting significantly increased operating speeds, while at the same time reducing permanent deformation of the molded closure. Improved formation of tamper-indicating features is also achieved. Because the present apparatus is configured so as to direct pressurized air between the forming pin and associated pin sleeve, the typical coolant passages in the tooling can be sized as desired, with the air passages further facilitating venting of the mold cavity as the closure is formed.

The reduction in interference between the forming pin and the molded closure, and the resulting reduction in ejection forces, desirably results in reduced thread deformation, reduced bulging of the tamper-indicating band portion of the closure, and reduced external side wall deformation at the thread locations. The high pressure air introduced into the molded closure has the further benefit of reducing the top panel concavity due to the reduction in the vacuum forces generated during ejection, and provides a deformation which counteracts the concave shrinkage of the top wall typically associated with the finished closure. The reduction in molding cooling time results in a significant decrease in the overall cycle time to form, cool, and eject the molded closure.

From the foregoing, numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. An apparatus for molding a plastic closure having a top wall portion and an annular skirt portion, the apparatus comprising:

a male mold assembly comprising a central forming pin, an outer pin sleeve within which said forming pin is positioned, and disposed coaxially about said forming pin and said outer pin sleeve, an ejector sleeve comprising: (i) a surface to sealingly engage a free end of said annular skirt portion of a closure molded upon said male mold assembly, said sealing engagement being characterized by its ability to maintain sufficient pressure in the closure during closure ejection to sustain a bulge in the closure annular skirt; and (ii) means to engage a closure molded upon said male mold assembly when moved axially relative to said mold assembly, thereby ejecting said closure from said male mold assembly; and a female mold which cooperates with said male mold assembly to define a mold cavity in which to form said plastic closure, wherein said male mold assembly and said female mold are characterized further in that they are axially moveable relative to each other and, said male mold assembly is further characterized in having at least one air passageway in fluid communication with an inside surface of said skirt portion of a closure molded thereupon, said passageway being positioned to permit pressurized gas conveyed through said passageway to contact at least a portion of said inside surface of said skirt portion.

2. An apparatus for molding a plastic closure in accordance with claim 1, including:

a plurality of air passageways extending axially between said central forming pin and said outer pin sleeve.

3. An apparatus for molding a plastic closure in accordance with claim 2, including:

at least one circumferential channel extending between said forming pin and pin sleeve joining said plurality of air passageways in fluid communication.

4. An apparatus for molding a plastic closure in accordance with claim 1 wherein said male mold assembly is configured to form at least one retention element on the inside surface of said skirt portion of a closure molded thereupon.

5. The apparatus of claim 4 wherein at least one said air passageway is in fluid communication with at least a portion of the inside surface of said skirt residing between said retention element and a free end of said skirt portion of a closure molded upon the male mold assembly.

6. The apparatus of claim 5 fitted to a compression molding apparatus and adjusted to eject a closure molded upon said male mold assembly prior to complete solidification of the plastic comprising said closure.

7. An apparatus for molding a plastic closure in accordance with claim 1, wherein:

said central forming pin and said outer pin sleeve are relatively movable and define an annular forming surface therebetween adjacent a free edge of said skirt portion of said plastic closure, said skirt portion of said plastic closure including at least one tamper indicating clement formed against said annular forming surface.

8. An apparatus according to claim 7 wherein said forming pin and said outer pin sleeve define cooperating annular surfaces for controlling flow of pressurized air into said molded plastic closure.

9. An apparatus for molding a plastic closure in accordance with claim 8, wherein:

said skirt portion of said plastic closure includes at least one tamper-indicating element formed against said annular surface of said central forming pin.

10. An apparatus for molding a plastic closure in accordance with claim 8, wherein:

said cooperating annular surfaces of said central forming pin and said outer pin sleeve provide a vent path for air within said mold cavity during molding of said plastic closure.

11. An apparatus for molding a plastic closure in accordance with claim 8, wherein:

said at least one air passageway extends between said forming pin and said pin sleeve.

12. An apparatus for molding a plastic closure in accordance with claim 1, wherein:

said central forming pin and said outer pin sleeve are relatively movable and define cooperating annular surfaces for controlling flow of pressurized gas directed against said inside surface of said skirt portion of a closure molded thereupon.

* * * * *